United States Patent
Roth et al.

(10) Patent No.: US 6,285,987 B1
(45) Date of Patent: Sep. 4, 2001

(54) INTERNET ADVERTISING SYSTEM

(75) Inventors: David William Roth; Dylan Salisbury, both of San Francisco, CA (US)

(73) Assignee: Engage, Inc., Andover, MA (US)

( * ) Notice: Subject to any disclaimer, the term of this patent is extended or adjusted under 35 U.S.C. 154(b) by 320 days.

(21) Appl. No.: 08/787,979

(22) Filed: Jan. 22, 1997

(51) Int. Cl.$^7$ .............................. G06F 17/40; G06F 17/60
(52) U.S. Cl. ............................ 705/27; 705/26; 705/14; 705/37; 705/400
(58) Field of Search .............................. 705/26, 27, 14, 705/37, 400

(56) References Cited

U.S. PATENT DOCUMENTS

| | | | |
|---|---|---|---|
| 4,703,423 | * 10/1987 | Bado et al. ............................... | 705/1 |
| 4,789,928 | * 12/1988 | Fujisaki .................................... | 705/37 |
| 5,105,184 | 4/1992 | Pirani ..................................... | 340/721 |
| 5,305,195 | 4/1994 | Murphy . | |
| 5,515,270 | * 5/1996 | Weinblatt ............................... | 705/14 |
| 5,584,025 | 12/1996 | Keithlety ............................... | 395/615 |
| 5,684,963 | * 11/1997 | Clement .................................. | 705/26 |
| 5,710,884 | * 1/1998 | Dedrick ............................. | 395/200.47 |
| 5,721,827 | 2/1998 | Logan et al. . | |
| 5,724,521 | * 3/1998 | Dedrick ................................. | 705/26 |
| 5,740,549 | * 4/1998 | Reilly et al. ............................ | 705/14 |
| 5,745,882 | * 4/1998 | Bixler et al. ........................... | 705/26 |

FOREIGN PATENT DOCUMENTS

WO 9726729  *  7/1997 (WO) .

OTHER PUBLICATIONS

Frook, John Evans, "Web sites sell ad space through auction—Despite industry skepticism, Individual Inc. and Netscape try out new strategies", Interactive Age, v2, n20, p. 5, 1 page, Jul. 1995.*

Article by Toland, P., entitled "CNET: The Computer Network Unveils Revolutionary Internet Advertising Tool That Allows Customer Banner Ad Delivery Based on Demographic Information", PR Newswire, Dateline: San Francisco, Dec. 6, 1995 (3 pages).

(List continued on next page.)

Primary Examiner—Allen R. MacDonald
Assistant Examiner—James W. Myhre
(74) Attorney, Agent, or Firm—Ropes & Gray

(57) ABSTRACT

A system for providing advertisements from a central server to viewers who access web sites. The central server stores both advertisements which are to be displayed and an information data base. The data base includes information about viewers, information about the characteristics of particular web sites and other information relevant to which advertisements should be displayed for particular viewers. Proposed bids submitted by different advertisers are evaluated in real time in order to determine which particular advertisement will be displayed to a viewer. Each proposed bid can specify a price or amount that the advertiser is willing to pay for the opportunity to display an advertisement (a) to a viewer who has a particular set of characteristics and (b) on a web site and web page that meets a particular set of criteria. The system includes (a) a web server system which has data bases stored therein, (b) bidding agents which compare the characteristics of viewops to the specifications in proposed bids and which submit bids as appropriate, and (c) bid selection logic which decides which bid to accept for each particular view-op.

17 Claims, 13 Drawing Sheets

OTHER PUBLICATIONS

"Sites Dip Into Cookies to Track User Info", 2 pgs, Obtained from Internet site http://www.webweek.com printed from Internet Aug. 5, 1996.

"Cybertimes Start Ups Plot to make the Web Confortable for Advertisers" 4 pgs Obtained from Internet site http://www.netgravithy.com printed from Internet Mar. 28, 1996.

"Click here for DoubleClick Information Request Form et. seq." 82 pgs, Obtained form Internet site http://www.doubleclick.net printed from Internet Aug. 4, 1996.

"Focalink Welcome to Focalink" 34 pgs. Obtained from Internet site http://www.focalink.com etc. printed from Internet Aug. 8, 1996.

"About Worldata Worlddata Information Marketing Services", 48 pgs. Obtained from Internet site http://www.worldata.com printed from Internet Sep. 3, 1996.

Imgis AdForce Features and Benefits: 12 pgs Obtained from Internet site http://www.imgis.com printed from Internet Jul. 28, 1996.

* cited by examiner

DATA TABLES 16B IN VIEW SERVER 320

| CU | WS | SP | TS | —408 |

TABLE NAME HUD

| AA | PP | CU | WS | SP | TS | AC | AJ | TSC | —409 |

TABLE NAME SOD

| LTS | IP | DN | CO | EA | BT | CU | ZC | PDC | —410 |

TABLE NAME CUD

| BL | CTL | VL | TE | AA | | —412 |

TABLE NAME AAD

415A
| | VODX | —415 |

NAME OF MEMORY AREA VOD

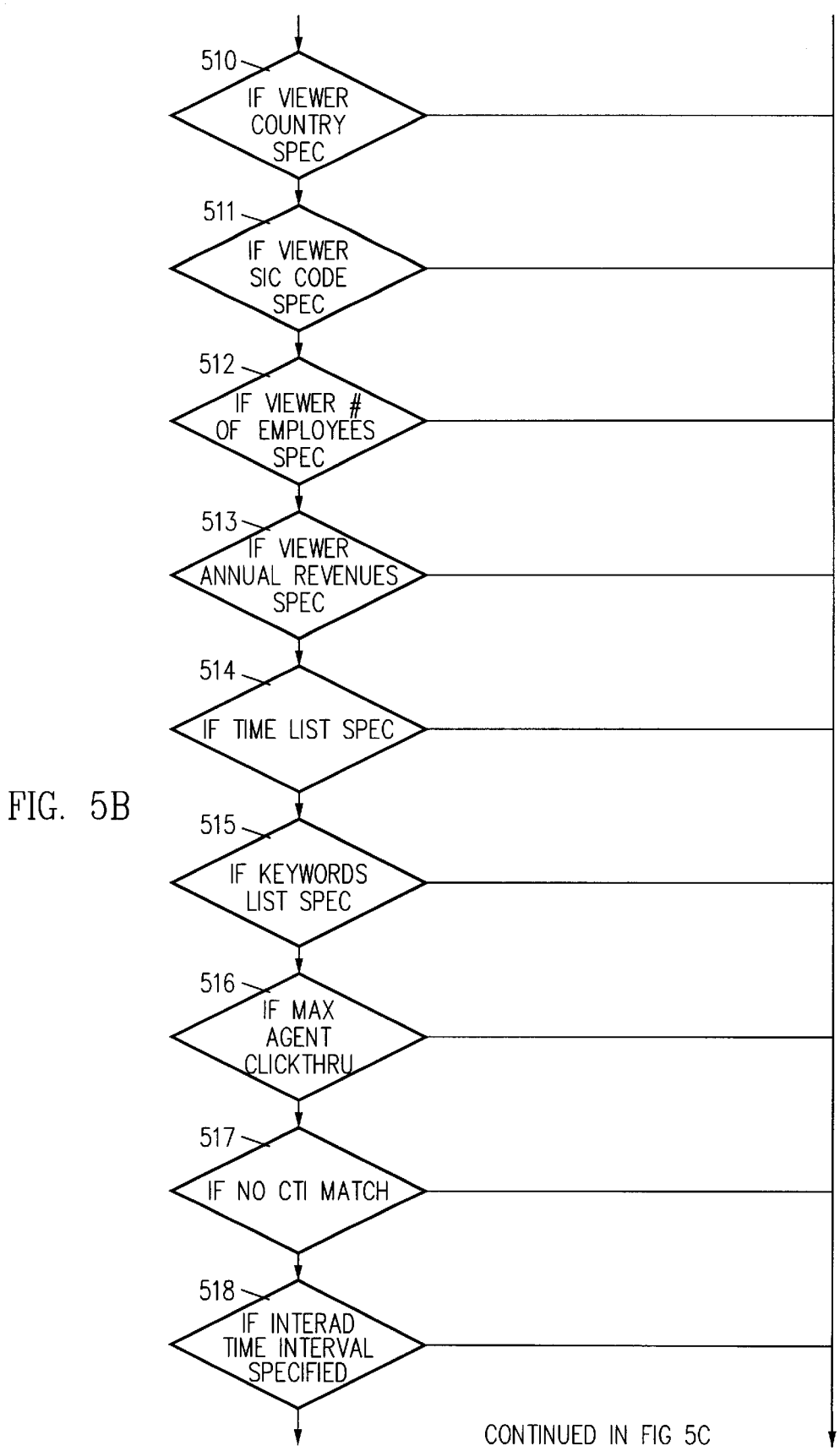

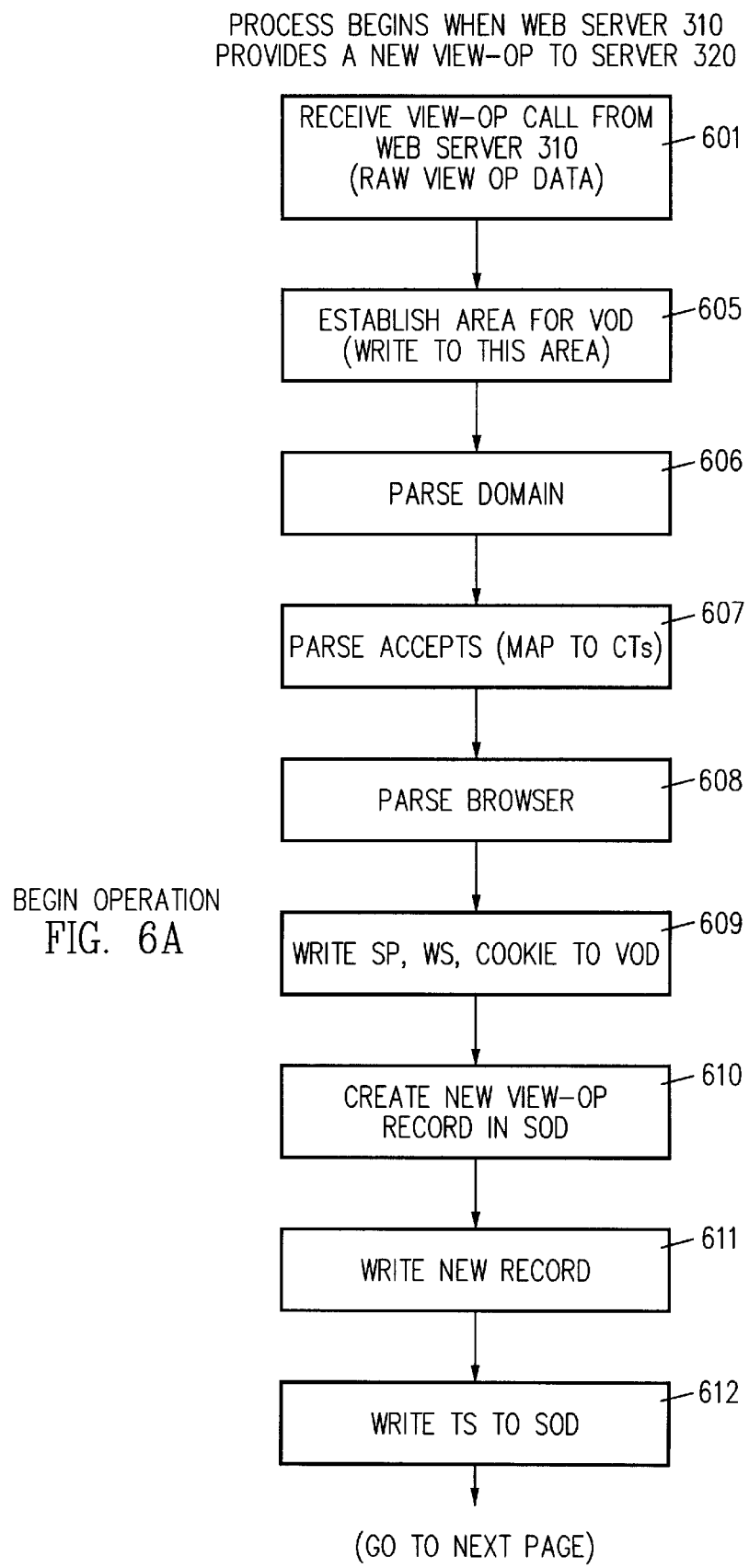

INTERNET ADVERTISING SYSTEM

FIELD OF THE INVENTION

The present invention relates to computer networks and more particularly to a method and system for selecting and then displaying advertisements on Internet World Wide Web sites.

BACKGROUND OF THE INVENTION

Many web sites on the Internet World Wide Web regularly display advertisements. The particular advertisement that is displayed when a viewer accesses a web site can either be stored locally on the web site or it can be stored on a central server. (As used herein the term viewer refers to an individual who views or looks at a web page using a program such as a web browser).

The Hyper Text Transfer Protocol (HTTP) and the Hyper Text Mark Up Language (HTML) provide a mechanism whereby a web page can easily reference material located on a remote server. The HTTP mechanisms for referencing and obtaining material from a remote server is useful in providing advertising material for display to viewers. There are commercially available systems which provide advertising material for web sites from a central server and various web pages have HTML references to this central server. With such an arrangement, when a viewer accesses a web page which has an appropriate HTML reference, the viewer sees advertisement that is provided by the central server.

Using standard HTTP facilities it is possible to track when a particular viewer accesses a web site and thus it is possible to compile a data base which in essence provides a profile of the sites a particular viewer has accessed. Furthermore, it is known that particular categories of viewers generally access particular types of web sites. The capabilities inherent in the World Wide Web for tracking the sites that a viewer has seen provides a mechanism for targeting particular advertisements to particular categories of viewers.

There are prior art systems which provide advertisements from a central server that has a data base of information concerning characteristics of viewers. A data base of viewer information can be compiled from a variety of sources including the information about a viewer which is available when a viewer accesses a server. In such prior art systems, the particular advertisement which is displayed when a particular viewer accesses a web site is determined by the characteristics of the viewer as provided by the data base of viewer information and by other information such as the characteristics of the web site which the viewer has accessed. Using such systems advertisers can target advertisements by criteria such as web site category, geographic location of the viewer, the operating system of the viewer's computer, the type of browser which the viewer is using, the Internet domain type of the viewer, etc.

Advertisers who use such prior art systems must specify in advance, the targeting criteria they want to use for their advertisements. The central server then provides advertisements to viewers based upon (a) the targeting criteria provided by the advertisers (b) the information which the central server has in its data base concerning the particular viewer, (c) information about the web site that has been accessed by the viewer and (d) other information available to the central server such as the time of day.

SUMMARY OF THE INVENTION

The present invention provides an improved method and system for providing advertisements from a central server to viewers who access web sites. With the present invention the central server system stores both advertisements which are to be displayed and an information data base. The data base includes information about viewers, information about the characteristics of particular web sites and other information relevant to which advertisements should be displayed for particular viewers. In contrast to the prior art systems, the present invention evaluates, in real time, bids submitted by different advertisers in order to determine which particular advertisement will be displayed to a viewer.

The fact that a viewer has accessed a web page which has an HTML reference to the advertising server of the present invention, is herein referred to as a view opportunity or view-op. The characteristics of each view-op include the characteristics of the particular web site and web page being accessed and the characteristics of the viewer including demographic information about the viewer and information as to what other sites this viewer has accessed in various periods of time.

With the present invention each advertiser provides one or more "proposed bids" which specify how much the advertiser is willing to pay for displaying a particular advertisement in response to a view-op with certain characteristics. Each proposed bid can specify a price or amount that the advertiser is willing to pay for the opportunity to display an advertisement (a) to a viewer who has a particular set of characteristics and (b) on a web site and web page that meets a particular set of criteria. Each proposed bid can be dependent upon or require satisfaction of various criteria which must be met in order for a bid of a particular amount to be submitted. For example an advertiser might specify that the first one thousand times that view-ops meeting certain criteria occurs, a bid of five cents will be submitted and each time thereafter that a view-op meeting the criteria occurs a bid of one cent will be submitted. The amount bid for a view-op can be dependent on as many criteria as the advertiser cares to specify. Another example is that an advertiser might bid ten cents if the view-op was by a viewer who had recently visited a particular web page and one cent for the same view-op if the viewer had not recently visited the particular web page. Yet another example of a parameter which could be specified in a proposed bid is the "click-through" rate for the particular site where the view-op originated. The click-through rate is the rate at which viewers click on an advertisement to access the advertiser's web site. Thus, the bidding parameters can either be simple or complex.

The present invention includes (a) a web server system which has data bases stored therein, (b) bidding agents which compare the characteristics of view-ops to the specifications in proposed bids and which submit bids as appropriate, and (c) bid selection logic which decides which bid to accept for each particular view-op.

With the present invention, when a view-op arises, the bidding agents evaluate the characteristics of the view-op compared to the specifications in proposed bids and the bidding agents submit bids to the bid selection logic where appropriate. Next, the bid selection logic selects the highest bid from the various available bids and the advertisement which is specified in the highest bid is displayed. The novel aspect of the present invention is the organization, operation and interaction between the bidding agents, the server which provides information to the bidding agents, the bid selection logic and the associated mechanisms for presenting the advertisements.

The present invention provides a very flexible system whereby advertisers can minimize cost and maximize effectiveness while the owner of web sites can obtain the highest possible revenue for displaying advertisements on their site.

BRIEF DESCRIPTION OF THE DRAWINGS

FIGS. 5A to 5C are flow diagrams showing how each view-op is evaluated or tested to determine if a bid should be submitted.

FIGS. 6A to 6E are flow diagrams showing the operation of the system.

DETAILED DESCRIPTION OF EMBODIMENTS OF THE INVENTION

Figure 1:
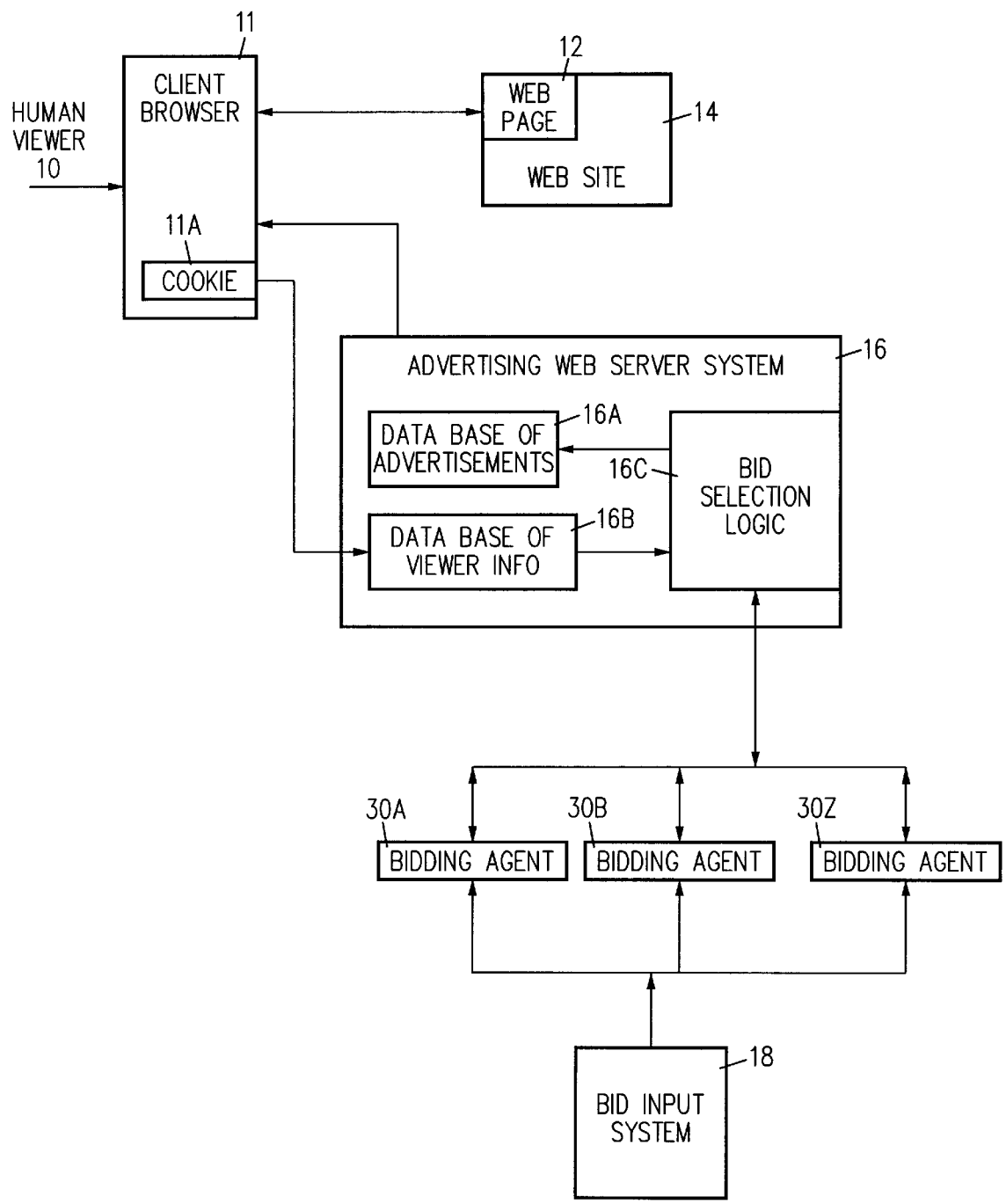
FIG. 1 is a simplified system block diagram of a preferred embodiment of the invention.
Figure 2A:
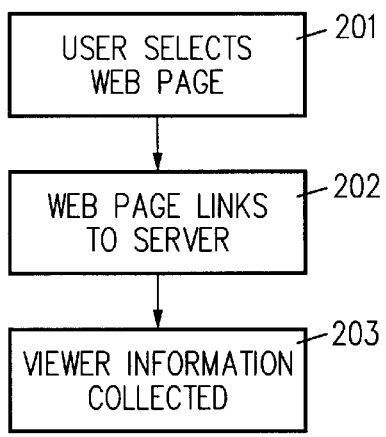
FIGS. 2A and 2B are simplified block flow diagrams of the operation of the invention.
Figure 2B:
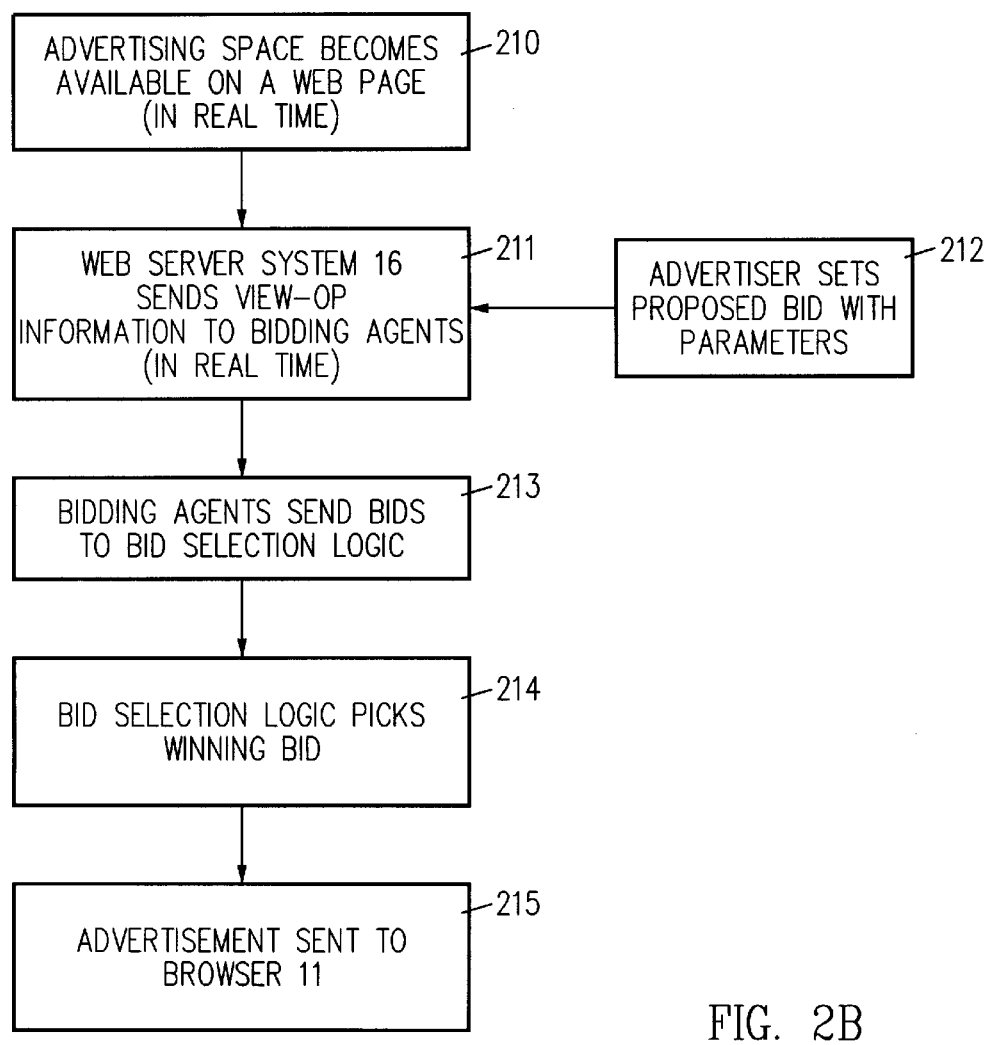

In order to explain the principles of the invention, an overall simplified diagram of a first preferred embodiment of the invention is shown in FIG. 1 and a simplified block diagram of the operation of the system is shown in FIGS. 2A and 2B. After the principles of the invention have been explained with reference to FIGS. 1 and 2, the first preferred embodiment of the invention is described with reference to FIGS. 3 to 6.

As shown in FIG. 1, a human viewer 10 utilizes a client browser 11 to access a web page 12 on a web site 14. The web page 12 is transmitted to browser 11 in a conventional manner. Web page 12 includes an HTML reference to a file (i.e. an advertisement) located on an advertising web server system 16. The client browser 11 has what is known in the art as a "cookie" 11A which provides information from browser 11 to the web server system 16. The client browser 11, the cookie 11A, the web site 14 and the web page 12 are all conventional and in widespread use. For example, the client browser 11 could be one of the commercially available web browsers, for example, the commercially available and widely used web browser marketed by Netscape Communications Corp. under the trademark "Netscape Navigator". The web site 14 and the web page 12 could be any of the thousands of web sites and web pages which are part of the World Wide Web and which have HTML references to advertisements which are located on a remote server.

Web page 12 includes an HTML reference to an advertisement stored on advertising web server system 16. Each time client browser 11 displays web page 12, the human viewer 10 will see an advertisement which is provided by advertising web server system 16. Such HTML references are in widespread use and they are implemented using conventional HTML tags. Advertising web server system 16 includes a data base of advertisements 16A, a data base of viewer information 16B, and a bid selection logic 16C. The bid selection logic 16C receives bids from bidding agents 30A to 30Z which in turn receive information concerning proposed bids from bid input system 18. For purposes of illustration only three identical bidding agents 30A, 30B and 30Z are specifically shown. The reference number 30 will be used to refer to a typical bidding agent It should be understood that the system could include any number of bidding agents. For example, a system could include several thousand bidding agents 30. Bid input system 18 provides bidding agents 30 with proposed bids which specify how much should be bid for view-ops with particular characteristics. Each bidding agents 30 evaluates each view-op to determine if the view-op meets the criteria specified in a particular proposed bid and if so how much should be bid.

Each bidding agent 30 evaluates a view-op with respect to one proposed bid to determine if a bid should be submitted. Each proposed bid includes a list of parameters which specify the particular type of viewer which the advertiser wants to reach. For example, a proposed bid might specify that the advertiser is willing to pay five cents for the opportunity to place an advertisement on a web page which is accessed by a viewer who has accessed three financial web pages and an automotive web page within the last week.

In general the system includes one bidding agent 30 for each proposed bid (see later discussion about multi-level bids). Each advertiser would have an associated bidding agent 30 for each ad campaign the advertiser wants to conduct. Advertisers submit proposed bid, to their associated bidding agents for evaluation against view-ops. Bidding agents 30 can be simple or complex and if desired they can have the ability to evaluate more than one proposed bid to determine what bid should be submitted to the bid selection logic 16C.

When a view-op presents itself (i.e. when viewer 10 accesses a web page 11 which contains an HTML reference to server system 16) the advertising web server system 16 performs four operations:

(1) It updates the information about the viewer which is in data base 16B.

(2) It sends information concerning the view-op to the bidding agents 30. The information sent includes information that the server system 16 received from browser 11 and information in data base 16B. Bidding agents 30 in turn decide which bids to submit to bid selection logic 16C.

(3) It compares various bids received from bidding agents 30 in order to determine which advertisement to display.

(4) It sends the appropriate advertisement from data base 16A to browser 11.

The operations performed by advertising web server system 16 are shown in FIGS. 2A and 2B. FIG. 2A shows how server system 16 uses the information from cookie 11A to update the data base of viewer information 16B to reflect the fact that this particular viewer has accessed this particular web page. The operations proceed as shown by blocks 201 to 203. Block 201 indicates that a viewer has selected web page 12 and that the selected web page has been transmitted to the viewer's browser 11. As indicated by block 202, web page 12 has an HTML reference to a file on server system 16 using conventional HTML techniques. Block 203 indicates that the server 16 then obtains data from cookie 11A to update the data base of viewer information 16B.

When a viewer 10 accesses web page 12, which has an HTML reference to server system 16, the present invention determines which advertisement from data base 16A to present to the viewer. The manner in which the system performs these operations is shown by block diagram 2B. For example, one advertiser might have submitted a proposed bid to bidding agent 30A which specified that he is willing to pay five cents for displaying an ad to a viewer who has accessed at least three financially oriented data bases within the last week. Another advertiser might have submitted a proposed bid to bidding agent 30B specifying that he is willing to pay six cents for displaying an advertisement to a viewer that has accessed at least three financially oriented data bases with the last five days. When a view-op occurs which is initiated by a viewer 10 who has accessed three financially oriented data bases in the last five days, bidding agents 30A and 30B would determine that the particular view-op satisfies the criteria specified by both advertisers. Both bids would be submitted to bid selection logic 16C and bid selection logic 16C would then select the highest bid and the advertisement specified by that advertiser would be displayed to the viewer. The criteria specified by the advertisers may be much more complex and involve many more parameters than those given in the simple example specified above. However, notwithstanding the complexity of the proposed bids and the number of parameters specified in each proposed bid, the operations performed by bidding agents 30 and by bid selection logic 16C are as explained in the above simple example.

As shown in FIG. 2B, a cycle of operation begins (block 210) when a viewer 10 selects a web page 12 which has a HTML reference to web server system 16, that is, when a view-op occurs. It is noted that this occurs in real time and it can take place thousands of times per minute. Block 211 indicates that the web server system 16 sends information concerning the view-op and related information in the data base 16B to the bidding agents 30. The bidding agents 30 compare the information about the view-op to the proposed bids that have been submitted by advertisers. That is, the bidding agents 30 determine if the characteristics of the view-op meet the criteria in the proposed bids and if so they submit bids to bid selection logic 16C (block 213). As shown by block 214, the bid selection logic 16C compares various bids and selects the highest bid and therefore an advertisement for display. The appropriate advertisement called for by the winning bid is then sent from data base 16A to browser 11 (block 215).

Block 212 indicates that each advertiser submits proposed bids, each of which includes various parameters which, for example, specify the type of web page on which the advertiser wants to advertise and an amount, (i.e. the dollar amount) which the advertiser is willing to pay for having a particular advertisement displayed. Details of the various parameters which can be included in a proposed bid are explained later.

In order to understand the power of the present system and its differences from the prior art, it is important to realize that the bidding agents 30 evaluate proposed bids in microseconds, that is, in real time. The rate at which "hits" on web pages occur (i.e. the rate at which viewers access web pages that have HTML reference to server system 16) can be in the order of thousands per second. Thus, the evaluation of proposed bids is performed very quickly in real time. Proposed bids can contain parameters which specify that a proposed bid will in effect change in real time. For example a proposed bid might specify that for the first 1000 matching view-ops, the proposed bid wail be five cents and for the next 1000 matching view-ops the proposed bid will be four cents. The actual submission of proposed bids by advertisers and the rate at which advertisers can change their proposed bids is measured in minutes compared to the rate at which the system evaluates proposed bids which is in the order of microseconds.

The operation of the browser 11, the operation of the web server 14, and the manner in which web pages produce HTML references to web server system 16 using the HTTP protocol and HTML mark up language are described in numerous published books such as "HTML Source Book A Complete Guide to HTML" by IAN S. Graham, published by John Wiley and Sons (ISBN 0 471-11849-4) or "The Internet Compete Reference" by Harley Hahn and Rick Stout, published by Osborne McGraw-Hill, ISBM 0 07-881980-6. Numerous other books are also available which describe the HTTP protocol. Such books describe how a browser, such as 11, can access a web page, such as web page 12, which in turn has an HTML reference to a file (i.e. an advertisement) stored on a server such as advertising server system 16.

Figure 3:
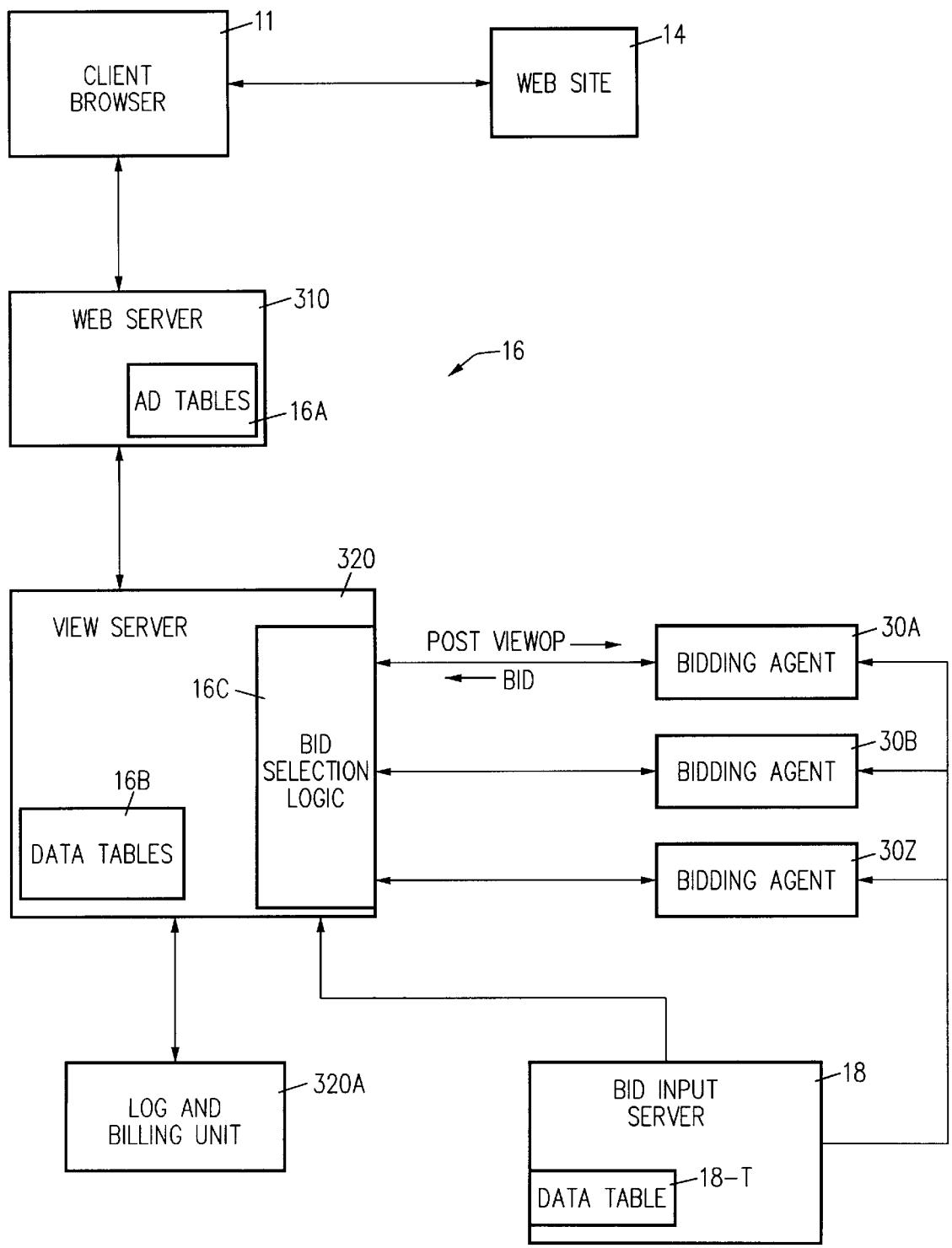
FIG. 3 is an overall block diagram of a preferred embodiment of the invention.

A more detailed block diagram of the preferred embodiment of the invention is shown in FIG. 3. Numerous additions and changes can be made in the preferred embodiment shown in FIG. 3 without departing from the spirit of the invention. As will be explained later with reference to FIG. 7, a number of systems, each identical to the system shown in FIG. 3, (and each of which is at a different geographic location) can be interconnected into a network so as to more efficiently service view-op requests.

As shown in FIG. 3, the preferred embodiment is composed of five main units, namely, wet server 310, view server 320 (servers 310 and 320 together comprise the advertising web server system 16 shown in FIG. 1), identical bidding agents 30A, 30B and 30Z, bid input server 18 and log and billing unit 320A. As stated with respect to FIG. 1, a system can include any number of bidding agents. A typical system could include a thousand or more bidding agents. For clarity of illustration only three bidding agents 30A, 30B and 30Z are specifically shown in FIG. 3. Hereinafter the term bidding agent 30 will refer to one representative bidding agent. It should be understood that there could be many bidding agents 30 in a system.

Bidding agents 30 evaluate bids to determine if a particular view-op meets the criteria of a particular bid. That is, bidding agents 30 compare the specifications in a proposed bid to the characteristics of a view-op. An example of the comparison process is explained later with reference to FIG. 5. Bid selection logic 16C in view server 320 determines which advertisement will be displayed, that is, which is the highest bid for each particular view-op.

The web client browser 11 accesses web sites (such as site 14) using the conventional HTTP protocol. The present invention begins to function when the web page which is accessed by browser 11 contains a conventional Internet HTML reference to web server 310.

The web server 310 provides an advertisement to web client browser 11 in response to an HTML reference. Such an operation is conventional. The function of the present invention i<; to determine which particular advertisement from data base 16A will be provided in response to each HTML reference from web client browser 11 to web server 310.

The web server 310, view server 320, bidding agents 30 and bid input server 18 can all be implemented by computer programs that are all resident in and executed by one single physical computer. Alternatively, each of the components may be implemented in separate physical computers connected by a conventional inter-computer network. The decision concerning implementation is a single computer or in a group of interconnected computers depends upon the cost, capacity and speed of the available computers. With respect to the explanation of the operation of the present invention, it is not relevant as to whether or not the various components are implemented in a single computer or in a network of interconnected computers.

The web server 310 can be implemented using conventional commercially available web server technology. For example, the commercially available web server marketed under the tradename Zeus can be used to implement web server 310. The operating system used in web server 310 is conventional and is not described herein. It could for example be the conventional Unix operating system likewise view server 320 and bid input server 18 have) a conventional operating system such as the Unix operating system. The processes and programs described herein run as application programs under such a conventional and commercially available operating system.

When web server 310 receives an HTTP request or HTML reference (a view-op), it delivers the contents the view-op to the view server 320. View server 320 in turn sends information concerning the view-op to bidding agents 30. Bidding agents 30 in turn evaluate the characteristics of the view-op (which includes information supplied by server 320) against the criteria specified in each proposed bid. If the characteristics of a view-op meet the criteria in a proposed bid, a bidding agent 30 will submit a bid to view server 320. After receiving input from bidding agents 30 (that is from all the bidding agents 30 that submit bids) the bid selection logic 16C in view server 320 selects the highest bid and indicates to web server 310 which advertisement should be displayed in response to the view-op. In response to the input from view server 320, the web server 310 delivers the appropriate advertisement to the web client 11

Bidding agents 30 must be programmed to evaluate proposed bids in a certain amount of time and to submit actual bids to server 320 within preestablished time limits. If server 320 does not receive a bid from a particular bidding agent 30 within a certain time, it assumes that it will not receive a bid from that bidding agent and it selects the highest bid from the bids received from the other bidding agents.

The main functionality or the "kernel" of the system is implemented in the view server 320 and in bidding agents 30. View server 320 has a number of tables, and conventional data base functionality for querying, inserting, updating and deleting data from the tables. The data base capabilities may be implemented using a conventional commercially available Structured Query Language (SQL) data base such as one of the data bases marketed by Oracle Corp. or the data base marketed by Microsoft Corp. under the tradename "Access". Alternatively, these tables can be implemented using specially written programming which optimizes the speed of certain operations.

View server 320 and bidding agents 30 are each objects (in the CORBA or Common Object Request Broker Request sense), they are persistent, and they can be moved across machine or network boundaries. Naturally performance is impacted depending upon whether or not these objects are implemented in one computer or in a network of connected computers. As is conventional, indexing techniques can be used in order to increase speed of operation related to the various tables.

The following terms are used herein with the following meaning:

Ad-Serve: Placing or "pumping" advertising content in an HTTP reply to a view-op. Note, putting advertising content in an HTTP reply results in an advertisement being displayed by a browser so that it can be seen by a Viewer.

Ad-Script: A script or mark up language for establishing bidding logic.

Bidding Agent A unit, computer program or agent (in the programming sense) that evaluates the characteristics of a view-op to determine if the criteria or parameters set out in a particular proposed bid meets the specifications of a particular view-op.

Click-through: The event that occurs when a Viewer clicks on an advertisement and is hyperlinked to new content.

Exposure: The number of ad serves for a particular advertisement.

Frequency: Number of times each viewer (on average) will be exposed to an advertisement.

In general the frequency is equal to the total number of exposures divided by the reach number.

I/CODE: A standard identifier assigned to individual viewers. I/Codes are used as registration information by many web sites. Interact Profiles Corporation offers a commercial service which collects in-depth demographic information about viewers for whom it issues or assigns I/Codes. This information or other similar information about viewers is stored in table 16B.

Internet: The global information system that is logically linked together by a globally unique address space based on the Internet Protocol (IP). The Internet is able to support communications using the Transmission Control Protocol/Internet Protocol (TCP/IP) suite.

IP Data: Data about the viewer which is specified using the Internet protocol. The IP data about a viewer is presented to the system at view-op time in accordance with standard HTTP conventions. The IP data is defined by standard HTTP conventions and it includes: CGI (common graphic interface) variables, Browser type (e.g. Netscape), viewers URL, high-level domain (.edu, .gov, .com, OS of viewer (MAC, Windows, etc.), host, IP address, and URL of referring Web page.

Maximum Bid Price: This is the maximum amount that can be specified when placing bids on behalf of a bidding agent. (see Minimize Bid).

Minimize Bid: This is an option that the media buyer (i.e. the person who buys the advertising) can set on or off (it is set for each media buy). If the option is set "on" then the system will try to bid the minimum amount necessary to maintain the level of buying that will ensure the desired number of impressions during the time allotted to the media buy. The amount bid will be increased as need to maintain the desired level of buying; however, it will never be increased beyond the maximum bid.

Pre-buy: The purchase of the right to display an advertisement in response to particular view-ops for a specified amount.

Proposed Bid: This is an offer to pay a particular amount for the opportunity to provide an advertisement in response to a view-op that has certain characteristics. If a view op satisfies the criteria specified in a proposed bid an actual bid (called a bid) is submitted to the bid selection logic 16C.

Reach: The total number of unique viewers the advertiser wants to reach with the media buy. Cannot exceed the total number of exposures.

Recently Seen Ad Data: Information relating to the most recent advertisements served to a unique or particular viewer.

Snot Buy: A decision to purchase a particular view-op for a specified amount which is made in real time.

View-op: The opportunity to serve an advertisement to a viewer that occurs when a web browser makes a request for content by referencing to a server. This is the basic unit of "perishable inventory" that advertisers buy.

View-time: The length of time that a viewer looks at an advertisement.

Viewer: A person who accesses a page on a web site and receives an Ad-Serve.

Viewer History Data: Historical data about a unique or particular viewer. This may include such information as previous viewing habits, purchases, click-throughs, etc.

Viewer Registration Data: Data collected by a web site (at viewer registration time) including age, sex, income, etc. The uploading of this data to the server data base is performed in non-real-time.

Web Avail: Sellers inventory, that is, a slot for advertising content. "Avail" is an advertising term. Web avail is the equivalent term applied to the world wide web.

Web Page Data: Data concerning a web page such as: keywords, stock categorizations. Also includes (non-real time) third party-supplied data, as well as data provided by the system operator with respect to traffic, pricing, etc. concerning a particular site.

Web Site Demographic Data: This is data about a specific web site.

Web Site: A term conventionally used in connection with the World Wide Web. Usually an Ad space provider (seller).

Figure 4:
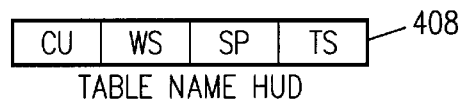
FIG. 4 is a diagram showing the organization of various tables which are utilized by the present invention.
Figure 4:
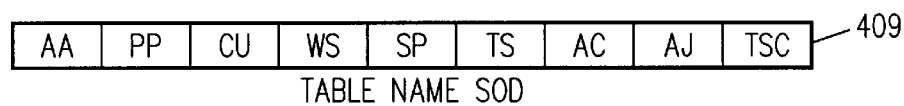
Figure 4:
Figure 4:
Figure 4:
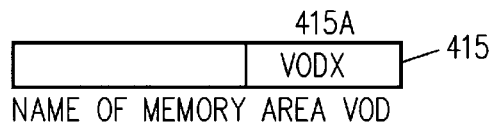

The system utilizes a number of data tables 16B which are stored in the view server 320 The structure of tables 16B are shown in normalized form in FIG. 4. The system also utilizes an area of memory for temporarily storing certain information. This area of memory is called the VOD area of memory. It should be understood, that as is conventional, some of the data in the tables 16B can be stored in program structures and indexes which can then be used to access the data in order to increase speed. For best performance all of the tables 16B must be located in RAM.

As shown in FIG. 4, there are four tables referred to as HUD, SOD, CUD, AAD and one special area of memory referred to as VOD. The four tables and the special area of memory are:

HUD table 408: This table stores Historic Viewer Data. It indicates which sites each viewer has previously accessed.

SOD table 409: This table identifies the previously "sold" view-ops. This table tells who previously bought which view-ops.

CUD table 410: This table identifies viewers and their characteristics.

AAD table 412: This table identifies every active advertiser. There is a record in this table for every active advertiser.

VOD area of memory 415: This area temporarily holds data which is being transferred to the bidding agents.

A conventional notation system is used to identify fields herein. Substructures of a main structure are designated by using the name of the main structure, followed by a period, followed by the name of the substructure. For example CUD.LST means the LST field of the CUD table.

The fields in the tables shown in FIG. 4 are identified using the following abbreviations:

HUD table 408 (Historic Viewer Data, which sites each viewer has previously accessed)
1) WS Web Site ID Site where ad was placed
2) SP Site Page ID Page where ad was placed
3) CU Current Viewer ID, this is, who saw the particular web site, the I/Code.
4) TI Time Interval
5) N Number of time the viewer CU visited the site in the time interval TI SOD table 409: (who previously bought which view-ops)
1) AA An identification of the bidding agent who purchased a view-op.
2) PP Purchase Price Purchase price for this view-op
3) CU Current Viewer ID I/Code of who saw the ad
4) WS Web Site ID where ad was placed
5) SP Site Page ID where ad was placed
6) TS TimeStamp when placed
7) AC Agent Content ID of ad that was placed
8) AJ Agent Jump ID of where click-throughs go
9) TSC TimeStamp when click-through happened, (0 for none)
10) VO View-op ID each view-op has a unique ID.

CUD table 410 (viewers and their characteristics)
1) LTS Last Seen Time Stamp, that is, time this viewer was last seen by the system
2) IP Internet Protocol address (from REMOTE_HOST)
3) DN Domain name Full Domain name (from REMOTE_ADDR)
4) CO Cookie
5) EA Email Address
6) BT Browser
7) CU I/CODE data
8) ZC Zipcode,
9) PDC Parsed Domain Items $1^{st}$ level, $2^{nd}$ level, $3^{rd}$ level parse domain items AAD Table 412 (identifies active advertisers)
1) BL BudgetLeft Current agent's budget remaining
2) CTL ClickThrusLeft Current click-through count remaining (number)
3) VL ViewsLeft Current exposure count remaining (number)
4) TE Time Expired Time expired (i.e. agent is "dead" or expired if not 0)
5) AA An identification of the bidding agent VOD memory area 415: This is a data communication structure in memory that facilitates passing data between objects. When a view-op is received, data is placed in the VOD area and then transmitted to the bidding agents. As an example, the following data can be placed in the VOD for transmission to the bidding agents.

1) Current Viewer Data
   CO Cookie—gives information about the viewer that initiated the view-op.
   EA Email Addr. of viewer that initiated the view-op.
   C I/Code of viewer that initiated the view-op.
   TS TimeStamp
   Last Seen Time Stamp
   IP Internet Protocol information
   Full Domain Name (e.g. "sales.gm.uk")
   Parsed Domain Name (e.g. Top="uk", $2^{nd}$="gm", $3^{rd}$="sales")
   I/CODE plus associated data
   Zipcode*
   BT Browser type (e.g. "Mozilla/Unix 4.0")
   VO View Op ID
   CT Content Type, Identifies a particular type of ad that site will accept.
2) Data About Advertisers
   Original and Current budget
   Original and Current Views budget
   Original and Current Click thru budget
   Time-Start/End
   advertiser ID
3) Site Data
   Keywords which appear on site
   Site Page Ad Minimum Price
   Accepts content List (what will site accept e.g. java, gif; sizes)
   Site Owner Name
   Site URL Site Title
Site Intra Page Title 4) Historic and other data from data base 16B: This is the VODX area 415A: This is a subset of the VOD structure and it is a subset of data that is in the CUD, MD, HUD and SOD. The data in the VODX is transmitted to the bidding agents on each view-op. The data placed in the VODX can for example be::

a) CUD Record Portions: Portions of CUD that exist such as domain, browser, I/code relative to a viewer associated with a view-op.

b) 100 SOD records where SOD.WS.SP=VOD.WS.SP That is, where site page and web site in SOD equal site page and web site in the VOD.

c) 100 SOD records where Customer ID (i.e. I/Code) in SOD equals Customer ID in VOD That is, sold view-op records for this Viewer.

d) 100 HUD records: most recent records for this CU, WS and SP.

In the above example, the historical data is in units of one hundred records. It should be understood that the number of historical records sent to the bidding agents, is established by determining the type of specification which advertisers want to put in proposed bids. If advertisers want to base the decision on whether or not to submit an actual bid on the data in more than 100 historical records, the number of historical records placed in the VOD must be larger than 100. Alternatively, in a low cost system which has a limited amount of memory, and relatively slow speed communication, the data selected for inclusion in the VOD could be less than the data listed above.

The data in the VOD is provided to the bidding agent 30 at every view-op. The bidding agents 30 can use this information to make a buy decision by comparing the criteria specified in a proposed bid with the characteristics of a view-op. All of the data that is listed above will not be available for each view-op. If certain data (ire. data in a particular field) is not available relative to a particular view-op and a proposed bid requires that the data in the particular field have a particular value, no actual bid will be submitted by the bidding agent when the proposed bid is evaluated. The list of information or data in the VOD as given above is illustrative and any available information which advertisers feel is relevant to making buy decisions can be provided.

Some of the data in tables 16B is collected as the system operates. Other information such as information about viewers can be purchased from commercial information providers and periodically inserted into the tables 16B from an external connection.

On each view-op, that is, when each view-op occurs, bidding information is presented to each of the bidding agents 30. When a bidding agent 30 receives information about a view-op, it evaluates the view op with respect to the criteria specified in a particular proposed bid and the bidding agent then either does nothing or returns to server 320 a bid with a price and an identification of an ad to display if the bid is accepted. When a bidding agent receives information about a view-op each bidding agent 30 performs comparison operations such as those shown in block diagram form in FIG. 5.

The bidding agents may be computer programs written in conventional computer languages. For example a bidding agent 30 may be a program in interpreted form, in script language (for evaluating proposed bids that are in Ad Script form) or a bidding agent may be a previously compiled program. The exact form of the bidding agents is not particularly relevant to the present invention provided that the bidding agent perform comparison operations such as those shown in FIG. 5. It is also noted that the bidding agents may be complex computer programs that perform various complex comparison operations in addition to or in place of the operations shown in FIG. 5. However, in the preferred embodiment of the invention, the bidding agents are simple conventional computer programs that perform the type of comparison operations shown in FIG. 5.

During the normal operation of the system, the process begins upon receipt of a view-op from the browser 11. Upon receipt of a view-op the system does the following:

1) An attempt is made to identify the viewer via HTTP connect information. The system seeks to determine if this viewer has been seen before. This is done using conventional and well know HTTP protocol techniques, the data in data base 16B and conventional data base technology.

2) The data concerning the viewer is used to update the table's Current Viewer Data (table 410) relative to this view-op's viewer.

3) A view-op object (VOD 415) is transmitted to each bidding agent 30.

4) The bidding agents 30 determine if the view-op meets the requirements of various proposed bids.

5) Bids are collected from the bidding agents 30 and a determination is made as to the winning bid.

6) The winning bid includes an ad index identifying the ad to be displayed. This ad index which identifies an ad in table 16A is transmitted to the web server 310 and the appropriate ad is sent to the browser 11.

7) The tables 16B are updated as to the view-op just bought (as to all view-op data of the just sold item including Historic Viewer Data such as Site, Viewer, Time seeing this exposure, etc.).

8) Log and billing information is transmitted to a log and billing unit.

Time Path: The following describes the time sequence of operations that occur when a HTTP view-op request arrives from the web server 310. This can be a multi-threaded operation, that is, multiple requests might be processed simultaneously; they each maintain their own context and depend on the basic operating system (OS) for time slicing. This describes the time sequence for processing one view-op request. The following description uses symbolic values for time.

Time0:
HTTP view-op request packet received
Extract HTTP variables from HTTP request:
   HTTP Query String (PATH_INFO) WS SP
   HTTP_VIEWER_AGENT
   HTTP_ACCEPT
   REMOTE_HOST==domain
   REMOTE_ADDR (IP)
   REMOTE_VIEWER
   REMOTE_IDENT
   HTTP_REFER Time1:
   Lookup in CUD and try to match viewer
   If success save CU and update Last Seen TimeStamp
   If failure Create new CU;
insert a new CUD record
Time 2:
  Create & build VOD object (contains view-op data for bidding agents) for the view-op.
Time 3:
  Lookup last N (i.e. 100) SOD records for CU, and save in VOD
Time 4:
  Lookup last N (i.e. 100) HUD records for CU.SW.SP, save in VOD
Time 5:
  Remember VO ID and initiate a time-out.
Time 6:
  Transmit VOD to all bidding agents.

After the VOD data is transmitted to the bidding agents 30, the bidding agents 30 evaluate proposed bids and if appropriate sent messages (bids) to view server 320. These messages will be bid object data (bid price and ad ID). View server 320 collects the bids and selects the highest bid. (This is done by bid selection logic 16C in view server 320 which compares each bid received with the current winner of the bid compete process until no further bids are received).
Time 7:
  Transmit winning ad index (that is the ad index from the winning bid) to web server 310. The ad-index indicates which of the ads in table 16A is to be transmitted to browser 11.
Time 8:
  Update table 16B (as to the view-op just bought);
Time 9:
  Insert in SOD view-op Data (as to all view-op data of the just sold item);
Time 10:
  Update or Insert Historic Viewer Data (as to Site, Viewer, Time seeing this exposure)
Time 11:
  Transmit Log/Billing information to the Log and billing unit 320A.

Proposed bids are submitted to bidding agents 30 by bid input unit 18. Each proposed bid, which is submitted in the form of a programming Form Object, contains data fields such as the data fields listed below. A particular proposed bid may not have data in each of the fields of the associated Form Object Furthermore one proposed bid may contain multiple Form Objects. That is, an advertiser may submit multiple form objects at multiple levels. For example, an advertiser may specify a level one proposal of five cents if one particular set of criteria are met and a level two proposal of four cents if other criteria are met. Each proposed bid (i.e. each form object) may contain a wide range of criteria that must be satisfied if an actual bid is to be placed. The criteria may be very stringent in a situation where the proposed bid is high and the advertiser wants to reach only a very select group of viewers. On the other hand the criteria may be loose if the bid is low and the advertiser wants to reach a large number of viewers who meet only a minimum set of criteria. For example, a proposed bid might have the single criteria such as that the view-op is from a viewer that is using the "Netscape browser". Alternatively a proposed bid might specify values for items "a", "b", "c", "e", "g", "h" and "i" listed below and specify that these values must be met before a bid is submitted for this advertiser.

Another example is that a bid might specify a set of criteria and a list of ads that are to be displayed in sequence each time a particular viewer who meets the criteria is encountered. Such a list is referred to as a "rotation" of ads. A proposed bid might also specify that after all the ads in a rotation are displayed to a viewer, there should be a specified delay before the viewer is again shown the ads in the rotation.

As an example, each form object may have the following fields (naturally it should be understood that these are merely illustrative and the number and description of actual fields is merely limited by the advertisers desires concerning what criteria the advertiser cares to specify in a proposed bid.):

a) Frequency: that is, the number of Ad serves for one unique viewer of this ad
  b) Include sites list (those sites that are acceptable to the advertiser)
  c) Exclude sites list (those sites that are not acceptable to the advertiser)
  d) Maximum bid . . . (in no event can the bid be larger than this amount)
  e) Keywords for site (words that must be in the site if a bid is to be submitted)
  f) Keywords for site-page (words that must be on the page)
  g) Times: Dayparts/Weekparts (when can ad be placed)
  h) Viewer OS (operating system viewer must have)
  i) Viewer Zipcode
  j) Viewer US State
  k) Viewer Domain (.com, .edu, .gov, mil, org)
  l) Viewer ISP
  m) Viewer Country
  n) Viewer SIC code
  o) Viewer # of employees
  p) Viewer Annual Revenues.
  q) Viewer Browser (what browser viewer must have)
  r) Inter-ad Delay (minimum time between placement of ads to a particular viewer)
  s) Rotation Delay (delay between placement of ads which are part of a series)
  t) List of ads in a rotation . . . (a list of ads that are placed in sequence, see example below)
  u) Other (Other criteria that advertiser may care to specify. Naturally, the bidding agent which receives a proposed bid must be programmed to compare the criteria specified in a bid to the data available concerning a view-op)

Bidding input server 18 includes a conventional data input program that allows entry of proposed bids with fields such as those listed the above. Each proposed bid is transmitted to a bidding agent 30. There is one bidding agent 30 for each proposed bid that is submitted. A system may include thousands of bidding agent programs 30. It should be understood that bidding agents 30 are conventional computer programs that evaluate proposed bids against the characteristics of a view-op to determine if a bid should be submitted to view server 320.

Bid input system 18 also transmits information to view server 320. For example the budget and identity of each advertiser is transmitted from bid input server 18 to AAD table 412. Entry, transfer and storage of such information is done using conventional data base techniques.

Figure 5A:
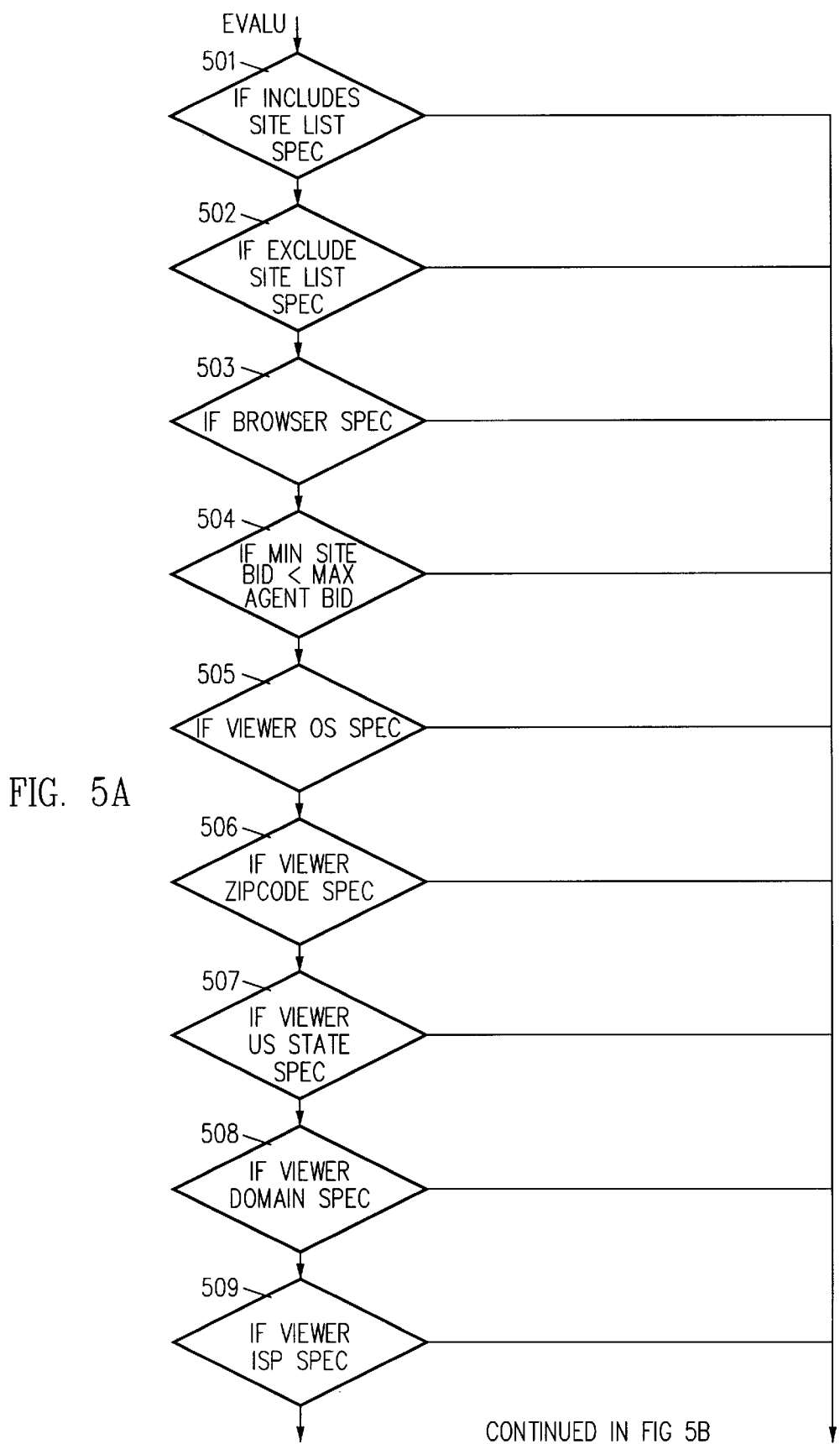
Figure 5C:
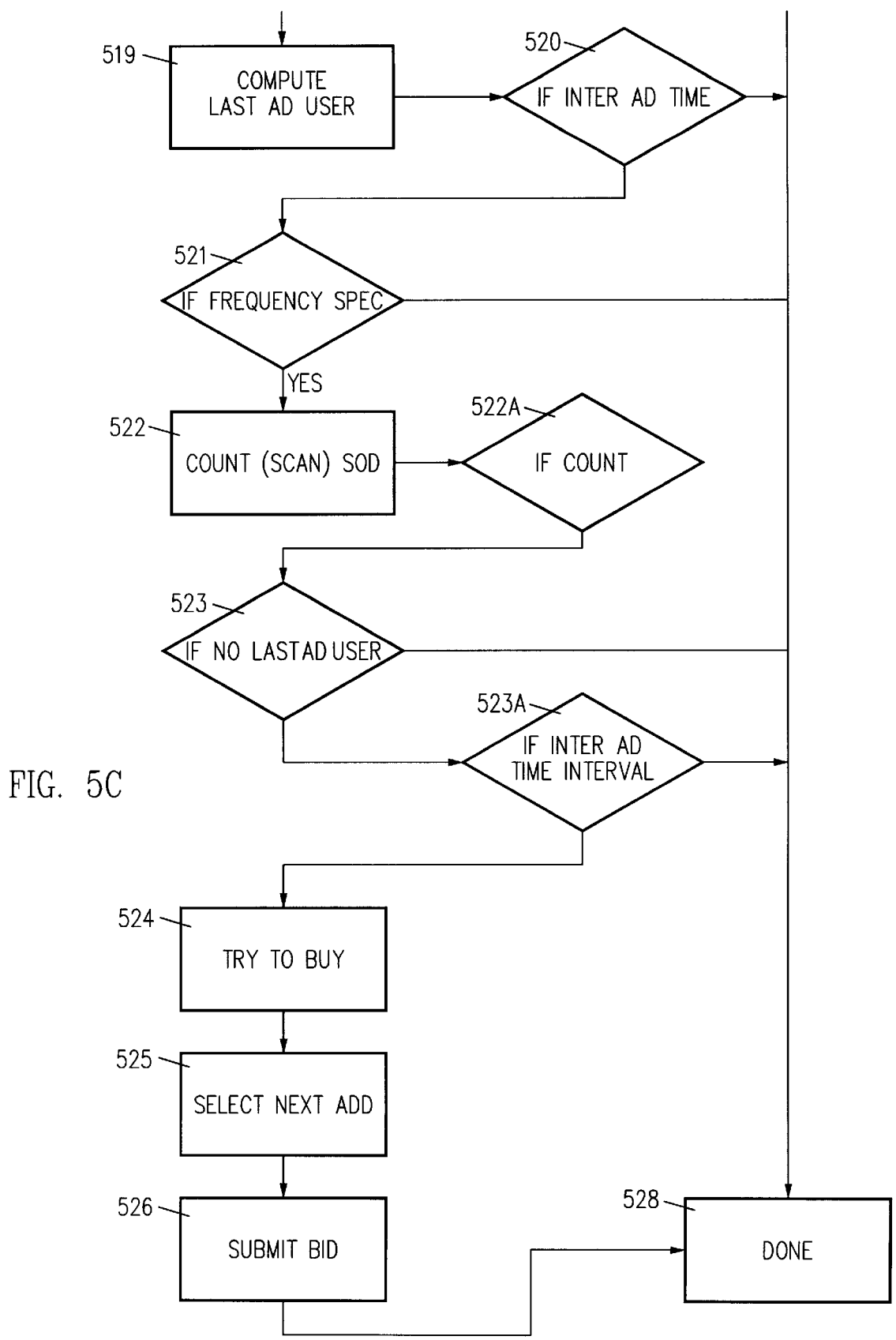
Figure 6B:
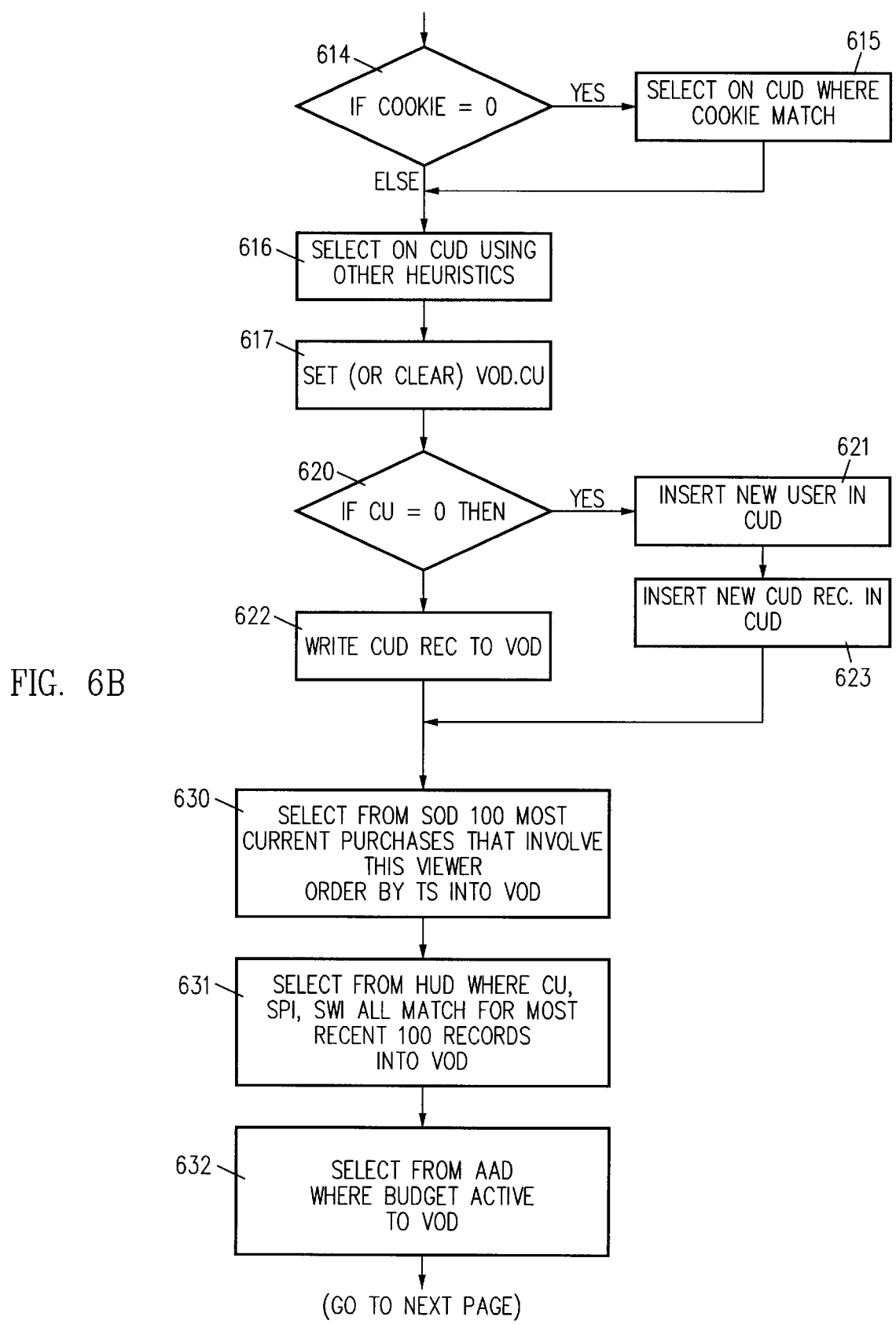
Figure 6C:
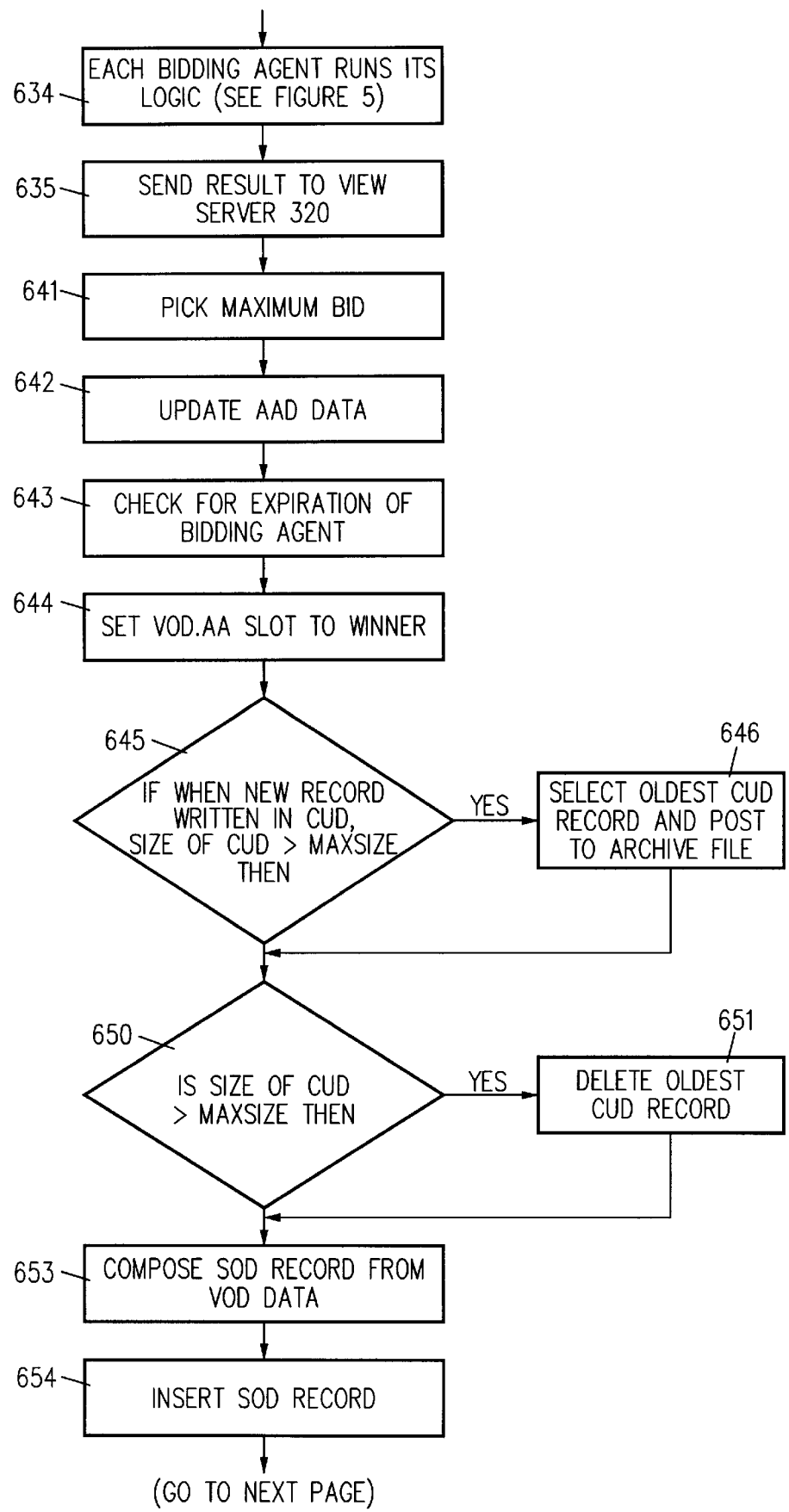
Figure 6D:
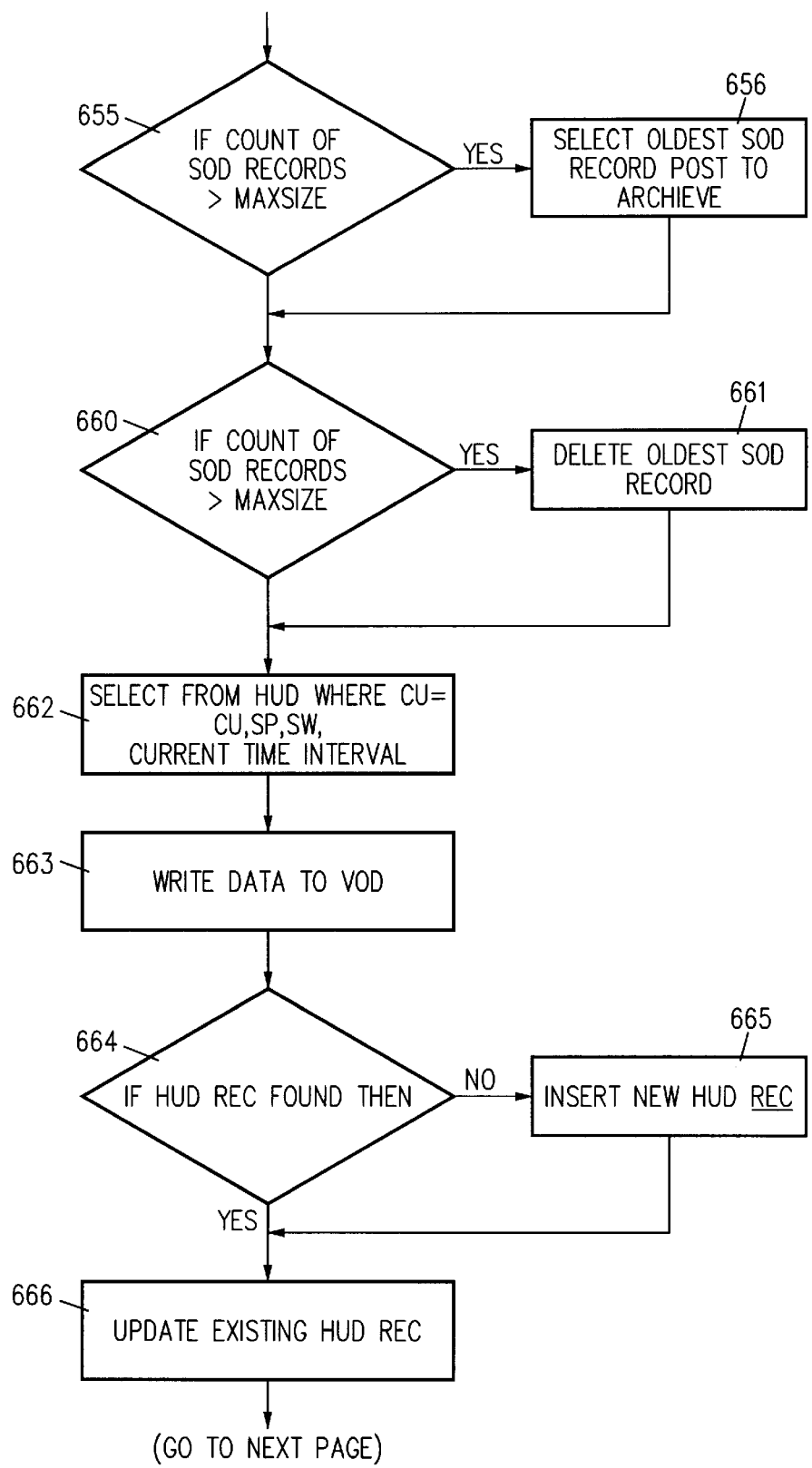
Figure 6E:
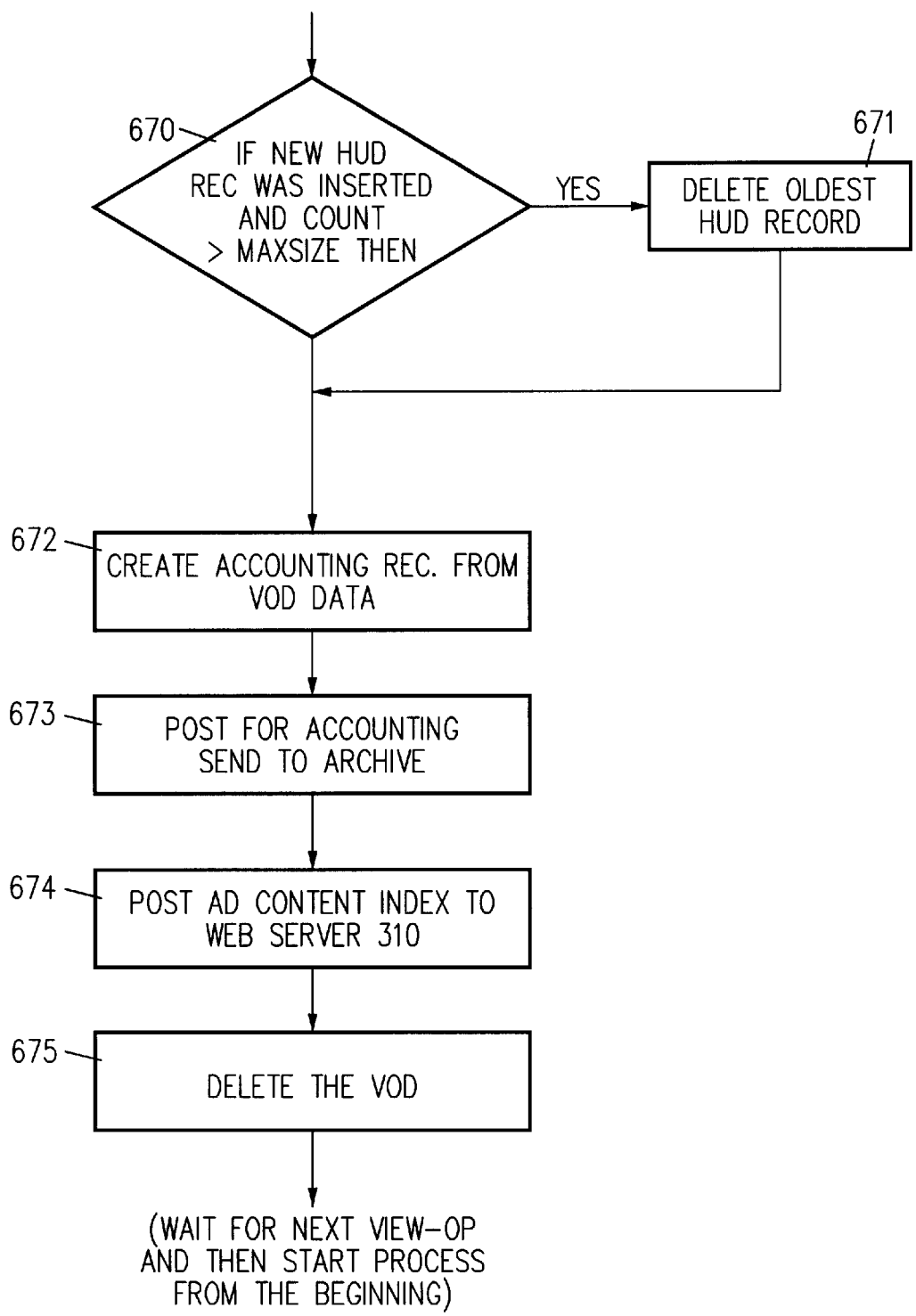

In the particular embodiment of the invention shown herein, the bidding agent programs 30 perform the operations shown in FIG. 5 relative to each level of each proposed bid. As previously indicated each proposed bid may include several bid levels. All of the above elements are repeated in each element. The process shown in FIG. 5 is executed for each level of each proposed bid. The Level 0 level is "run" first, the Level 1 next, and so on. This means that level 0 requirements are evaluated first. If they succeed, the bid is placed as dictated in that level's data. Otherwise Level 1 requirements are checked, and so on. Each level's requirements can be totally independent, but preferably they should get successively less strict, such that the proposed bid value decreases.

The program shown in FIG. 5 is executed for every view-op. It first uses the specifications for Level 0, then on "NEXT," or a failure to meet criteria for a level, it starts over with the next level's criteria. The proposed bid evaluation program shown in FIG. 5 performs tests such as the tests shown below upon a proposed bid prior to submitting an actual bid to view server 320. It should be understood that the test below are merely illustrative and any variety of tests can be performed in comparing the characteristics of a view-op with the specifications in a proposed bid. The tests required is limited solely by the desires of the advertiser. Programming for performing such tests and comparisons between specified characteristics of a view-op and specifications in a proposed bid is conventional programming. In the illustration given in FIG. 5, the following tests are performed by the bidding agent program.

Block 501: If Include site List is specified and WS (Web Site ID) is not in Include site List go to DONE, if not go to next test.

Block 502: If Exclude site List specified and WS (Web Site ID) in Exclude site List go to DONE, if not go to next test.

Block 503: If Browser specified and no match with Browser being used, go to DONE, if not go to next test.

Block 504: If MIN site bid <MAX Agent bid go to DONE, if not go to next test (note that a web site can specify a minimum amount (Min site bid) that the site will accept for displaying an advertisement).

Block 505: If Viewer OS specified and no match go to DONE, if not go to next test.

Block 506: If Viewer Zipcode specified and no match go to DONE, if not go to next test Block 507: If Viewer US State specified and no match go to DONE, if not go to next test.

Block 508: If Viewer Domain specified and no match go to DONE, if not go to next test Block 509: If Viewer ISP specified and no match go to DONE, if not go to next test.

Block 510: If Viewer Country specified and no match go to DONE, if not go to next test.

Block 511: If Viewer SIC code specified and no match go to DONE, if not go to next test.

Block 512: If Viewer # of employees specified and no match go to DONE, if not go to next test.

Block 513: If Viewer Annual Revenues specified and no match go to DONE, if not go to next test.

Block 514: If Time List specified and current time not in Time List go to DONE, if not go to next test.

Block 515: If Keywords list specified and Keywords not in Site Keywords List go to DONE, if not go to next test.

Block 516: If MAX Agent click-through bid specified and MIN site click-through bid then if MIN site click-through bid<MAX, Agent click-through bid go to DONE, if not go to next test.

Block 517: If No CT (content type) match in Ad list go to DONE, if not go to next test.

Block 518: If InterAd Time interval specified then Compute (block 519) (scan for) LastAdViewer for this CU (Last time this viewer saw an ad fulfilled from this agent) from SOD List of 100.

Block 520: If InterAd Time Interval and if TimeStamp of LastAdViewer<Inter Ad Time Interval go to done, if not go to next test.

Block 521: If Frequency specified perform block 522, that is, Count (scan) SOD per CU for ads sold by this agent. (Block 522A) If this count>Frequency go to DONE, if not go to next test.

Block 523 If no LastAdViewer (no record of serving this Viewer) go to done, if not go to next test.

Block 523A if InterAdTimeInterval specified then if TimeStamp of Last Ad Serve<Inter Ad Time Interval go to DONE, if not go to next step.

Block 524: TRY TO BUY AD with the following steps:

Block 525: Select Next Ad to Serve based on CT match, LastAdViewer or Last Ad Served Block 526: Submit BID: Include in the bid submitted to view server 320, the ad ID in the form of an index that can be used by web server 310 to select a bid from ad table 16A for display.

Block 528: The process is DONE

The process that the web server 320 follows when it receives a view-op is shown in FIGS. 6A to 6E. The process includes the following steps:

Begin Process FIG. 6A:

Block 601: The process begins when the view server 320 receives a ViewOpDrive() call. That is when Raw view-op Data is sent to view server 320.

Block 605: Establish an area in memory for VOD structure (we will write to this area)

Block 606: Parse the Domain

Block 607: Parse Accepts (map this to CT)

Block 608: Parse the Browser field

Block 609: Write SP, WS, and Cookie to the VOD

Block 610: Create New view-op record in SOD

Block 611: Write available information about view-op to new record in SOD

Block 612: Write TS to SOD

Block 614: Check to see If Cookie=0 (Is there a Cookie in the request)

Block 615: If Cookie=0 select on CUD where there is a Cookie match

Block 616: If Cookie not=0 Select on CUD using other heuristics of viewer

Block 617: Set (or clear) VOD.CU

Block 620: check if there is a current viewer.

Block 621: if CU=0 Insert new viewer in CUD

Block 623 Insert the new CUD rec. in CUD

Block 622: Write CUD record to VOD

Block 630: Select from SOD where CU=VOD.CU for 100 order by TS into VOD and go to next procedure. This selects the 100 most current purchases that were presented to the particular viewer. Write to VOD Block 631: Select from HUD where CU,SP,SW all match for 100 most recent records in VOD. Write to VOD Block 632: Select from MD for every active budget. Write to VOD (Write any other data needed by bidding agents to VOD)

Block 634 Send VOD data to Bidding Agents. Each bidding agent run its logic (see FIG. 5)

Block 635: Bidding agents send result to View Server 320 (This following is the process where bid selection logic 16C in view server 620 picks the best bid)

Block 641: Pick maximum bid

Block 642: Update AAD data

Block 643 Check for expiration of bidding agent in AAD table

Block 644: Set VOD info to winner and go to next procedure.

Block 645: check if CUD exceeds its maximum.

Block 646 if block 645 answer is yes, Select oldest CUD record, Post it to a CUD archive file Block 650: check if CUD>MAXSIZE.

Block 651: If block 650 answer is yes, Delete oldest CUD record and proceed.

Block 653: Compose the SOD record from VOD data.

Block 654: Insert SOD record.

Block 655: check if count of SOD records>MAXSIZE: if no go to next procedure.

Block 656: If block 655 answer is yes, Select oldest SOD record, POST it to an archive file and go to next procedure.

Block 660: check if count of SOD records>MAXSIZE, if answer is no, go to next procedure Block 661: If answer to block 660 is yes, delete oldest SOD record.

Block 662: Select from HUD for CU, SP, SW, current time interval. That is, select for this current viewer, for this bidding agent, on this web site, for this time interval.

Block 663: Write data to VOD and go to next procedure.

Block 664, Check if HUD Rec==0 That is, if HUD record was found

Block 665, If no HUD record found, Insert New HUD rec.

Block 666: If HUD record was found, Update existing HUD rec.

Block 670: check if new Hud Rec was inserted and count>MAXSIZE.

Block 671: If answer to block 670 is yes, Delete oldest HUD rec.

Block 672: Create Accounting Rec. from VOD data.

Block 673: POST the data to an archive file

Block 674: Post ad info to web server 310. That is, tell web server 310 which ad to display.

Block 675: Dequeue, Delete the VOD. This is the end of the procedure. It starts again at the next view-op.

The series of steps shown in FIGS. 6A to 6E are the procedural operation performed by the view server 320. These can be programmed using any of the conventional programming languages such as SQL. The particular computer used to perform the program is of no particular consequence so long as it is fast enough to provide a reasonable degree of performance. In order to speed the operation of the system if there is a large number of bidding agents 30, the bid selection logic 16C may be implemented using hard wired logical circuitry rather than by utilizing a computer program. The programming or circuitry in bid selection logic 16C is conventional. It merely receives the bids from each of the bidding agents 30 and selects the highest bid and then transfers the ad index for this bid to web server 310 and transfers other information about the bid to the data tables 16B and to log and billing unit 320A.

Web Server 310: The web server 310 is a conventional web server which is programmed to provide two main functions:

1) Answer and hold the state of each HTTP request; deliver the view-op to the system kernel in view server 320; receive the system kernel reply and deliver the content. This is a multi-task operation. The contents (the IP data) of each view op, along with its type (either a request for content or a click-through) are delivered to the view server 320. This communication is through shared memory or alternatively it may be through a conventional inter-computer network.

2) Install and remove Ad content separately, and asynchronously. Service requests to install (store) and remove (delete) ads from data base 16A. On an install, the web server returns a WC, a handle or index to the location of the ad. WCs should be unique for the life of the system. This is done by a conventional data base program.

Bid input server 18 is a conventional data base server which accepts information and deliver; it to the tables in view server 320 and to bidding agents 30. Bid input server 18 provides a data input mechanism for the system. Data table 18-T in bid input server 18 stores the identity of each of the advertisers and the particular bidding agents 30 to which bids from that advertiser should be sent. Bidding agents 30 can all be identical or alternatively some may have capability for evaluating more complex criteria in proposed bids. The data table 18T stores information which indicates which bidding agent should receive proposed bids from which advertisers. Bid input Server 18 is a conventional data base input unit.

The log and billing unit 320A is a conventional data base program that provides conventional log and billing functions. As concerning users and web sites becomes old and stale, it is transmitted to an archive in log and billing unit 320A. A log of all transactions that takes place in the system is also maintained by unit 320A. This is done using conventional programming techniques.

In the figures, only one web browser 11 is shown. It should be understood that web browser 11 is merely representative of the web browsers connected to the Internet world wide web. Web server 310 is connected to the Internet and hence it can receive HTML references from any of the millions of browsers connected to the Internet. Web browser 11 is merely illustrative of one of the browsers connected to the Internet.

The specifics of the various data bases, the specifics of the various fields in the data bases, and the specifics of the form used to submit a bid, the parameters that are considered in evaluating bids, as shown herein are illustrative only and various changes in the data bases, the fields and the parameters along with changes in the operation of these details of the system could be made without departing from the spirit and scope of the invention.

Specific data can be introduced into data base 16B in a number of ways. Some of the data is collected as previously described as the system operates. Other data can be viewer registration data, that is data obtained when viewer register at related web sites. Likewise viewer history data in data base 16B can be collected as the system operates or it can be purchased from commercial sources and entered into data base 16B as a batch of information. Web site demographic data can be collected from commercially available sources and entered into data base 16D.

The specific data collected in data base 16B is determined by the criteria that advertisers want to establish in proposed bids. Data base 16B can store any type of information that advertisers care to specify in proposed bids. Any data that advertisers want to use in setting specifications in proposed bids can be stored in tables 16B using conventional data base technology. This data is transferred to the VOD area of memory and to the bidding agents 30 when a view-op occurs. Bidding agents 30 must be programmed to compare the data received from the VOD to the specifications in a proposed bid to determine if an actual bid should be submitted.

It is herein assumed that a viewer always accesses the world wide web using the same browser, so that the cookie in a browser accurately reflects what a viewer has done. It is also assumed that only one viewer uses a particular browser, again so that the cookie in the browser accurately reflects what the particular viewer has done. If different individuals use different sign-on names with the same browser, or if different individuals who use the same browser otherwise identify themselves to the system, they can be assigned separate I/codes even though they use the same browser.

It is also noted that a system could combine the operation of the present invention with the operation of the prior art type of system where access to advertising on particular web sites is sold for a specified amount. An operator of the system could sell "pre-buys", that is, access to the view-ops that occur on a particular site and the operator could insure that a particular advertiser always has access to these view-ops as done by the prior art systems. This could be done by merely entering into the system proposed bids with a value that is the maximum allowed by the system for those particular view-ops that are sold as pre-buys.

Figure 7:
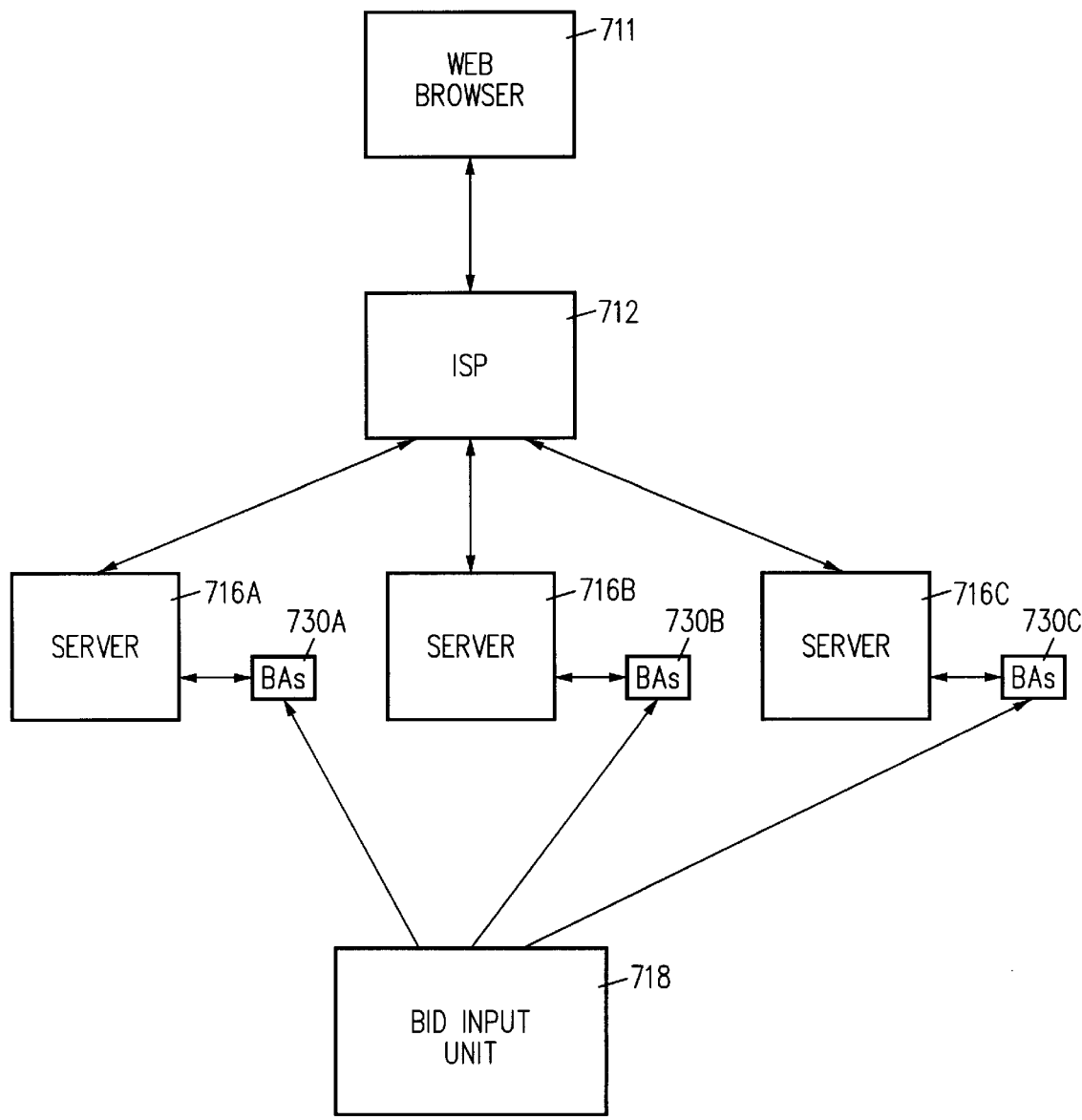
FIG. 7 is a block diagram of an alternate embodiment of the invention.

An alternative embodiment of the invention is shown in FIG. 7. The system shown in FIG. 7 is designed to minimize latency due to Internet topographical distance between units.

The embodiment shown in FIG. 7 is a geographically distributed system which includes three systems 716A, 716B and 716C each of which are identical to systems 16 shown in FIGS. 1 and 3. Each of the systems 716A, 716B, and 716C have associated bidding agents 730A, 730B and 730C. Each of the systems 716A, 716B and 7126C is located a different geographic area.

Client browser 711 sends web HTML references (such as those sent from browser 11 to web server 310) to a commercial Internet service provider (an ISP) 712. The ISP in turn sends an HTML reference to the system 716A, 716B or 716C which is "topographically" closest to the browser 711. For example, the three systems 716A, 716B and 716C could be located on different continents, one in the U.S., one in Europe and one in Japan. With the system shown in FIG. 7, HTML references from browsers in Europe would be directed to the system in Europe, HTML references from browsers in the U.S. would be directed to the system in the U.S. etc. The bid input unit 718 sends each proposed bid to bidding agents 730 associated with each system. Thus, the systems 716A, 716B and 716C evaluate each proposed bid against the particular view-ops that are directed to each particular system. While for purposes of illustration, three systems 716A, 716B and 716C are shown, any number of such systems could be connected in an overall network of systems.

While the invention has been shown and described with reference to preferred embodiments thereof, it should be understood that other embodiments are possible and that various changes in form and detail may be made without departing from the spirit of the invention. The scope of the invention is limited solely by the appended claims.

What is claimed is:

1. A system for supplying advertisements for display during a series of viewing opportunities (view-ops) which occur during the display of web pages on the Internet world wide web, each of said view-ops having specific characteristics,
    a plurality of bidding agents,
    a server for providing information concerning each view-op to said bidding agents,
    a bid input system for providing proposed bids to said bidding agents, each proposed bid including, a reference to a specific advertisement, specifications of a desired view-op and a monetary amount which will be paid for displaying said specific advertisement in response to a view-op which meets said specifications of a desired view-op,
    each of said bidding agent including logic for submitting a bid and a reference to a specific advertisement to said server if the information concerning a view-op satisfies the specifications of a desired view-op contained in a proposed bid, and
    said server including bid selection logic for selecting the highest bid submitted by a bidding agent and for transferring the advertisement referenced in said highest bid to the web site presenting said view-op.

2. A server system for providing advertisements in response to HTML references from a web page, each HTML reference includes information identifying the source of said web page, said server system including,
    a data base of advertisements,
    a data base of viewer information including information concerning prior HTML references,
    means for accepting proposed bids which specify a monetary amount for providing a particular advertisement in response to web page HTML references which satisfy specified criteria, said specified criteria including information included in said HTML reference and information from said data base of viewer information,
    means for determining if a particular HTML reference satisfies said specified criteria,
    means for selecting the highest bid which satisfies said specified criteria, and
    means for responding to said HTML reference with the particular advertisement specified bit said selected bid.

3. A system for placing advertisements on web pages on the world wide web which are accessed by a viewer,
    a first server which stores advertisements, said web pages having HTML references to said first server,
    a data base of information on viewers,
    bid input means for accepting bids to place advertisements on web pages which have particular characteristics and which are accessed by viewers having particular characteristics, and
    bid selection means for selecting the highest bid for placement of an advertisement on a particular web page.

4. A system for displaying advertisements to viewers who access a web page comprising
    a web server which stores a plurality of advertisements,
    bid input means for providing to said system bids specifying characteristics of users and web sites where it is desired to display advertisements and a dollar bid for the right to display an advertisement on a site with the specified characteristics
    a server system which includes means for evaluating bids, for selecting one of said advertisements in response to said bids and for designating to said web server which of said advertisements should be displayed,
    whereby the particular advertisement that is displayed to a viewer is determined by a bidding process.

5. In an Internet which is operating according to the HTTP protocol, and which includes a browser for viewing web pages and for HTML referencing to remote servers,
    a server which has stored therein a number of advertisements,
    means for providing to said system bids for the opportunity to display advertisements on web pages which have been accessed by a viewer having specified characteristics, selection means for evaluating said bids and comparing them to the characteristics of a viewer that accesses a web page, said selection means including means for selecting the highest bid for a particular view-opportunity.

6. A method of placing advertisements on web pages on the world wide web which are accessed by a viewer utilizing a browser, storing advertisements in a data base on a first server, said web pages having HTML references to said first server, maintaining a data base of information on viewers, accepting bids to place advertisements on web pages which have particular characteristics and which are accessed by viewers having particular characteristics, selecting the highest bid for placement of an advertisement on a particular web page.

7. A system for placing advertisements on web pages on the world wide web, said web pages being accessed by viewers, each viewer utilizing a browser, a first server which stores advertisements, said web pages having HTML references to said first server, a data base of information on viewers and on the web sites that have been accessed by particular browsers, bid input means for accepting bids to place advertisements on web pages which have particular characteristics and which are accessed by particular browsers which have been previously used to access web pages having particular characteristics, bid selection means for selecting the highest bid for placement of an advertisement on a particular web page which has particular characteristics and which has been accessed by a browser which previously has accessed particular web sites.

8. The system recited in claim 7 where said world wide web is accessed by using HTTP protocol on the Internet.

9. A system for determining which advertisement to place on a web page that has been accessed by a viewer using a browser, a first web server which has stored thereon advertisements, said web page having a HTML reference to said first web server, a client server which provides means for entering bids to place particular advertisements on particular web pages which have particular characteristics and which are accessed by particular browsers which have previously accessed particular web pages, a viewer data base which has information concerning which web pages have been accessed by particular browsers, a view server which evaluates the bids which have been entered and selects the highest bid for displaying an advertisement on a particular web page.

10. The system recited in claim 9 including a server which includes means for checking bids to determine if web page meets the specifications in a particular bid.

11. The system recited in claim 9 wherein a determination of which advertisement to place on a particular web page in done in machine real time and said bids are entered in human real time.

12. The system in claim 9 wherein said viewer data base includes information about viewers.

13. A method for placing advertisements on web pages on the world wide web, said web pages being accessed by viewers, each viewer utilizing a browser, storing advertisements on a first server, said web pages having HTML references to said first server, storing a data base of information on viewers and on the web sites that have been accessed by particular browsers, providing bids to place advertisements on web pages which have particular characteristics and which are accessed by particular browsers which have been previously used to access web pages having particular characteristics, selecting the highest bid for placement of an advertisement on a particular web page which has particular characteristics and which has been accessed by a browser which previously has accessed particular web sites.

14. The system recited in claim 1 wherein each view-op has an associated viewer and said server includes a data base of information concerning viewers.

15. The system recited in claim 1 wherein said server includes a data base with information about web sites.

16. A computerized method for supplying and pricing electronic advertisements, comprising:

a. Storing client profile information in a computer database;

b. Providing the client profile information to advertisers;

c. Receiving electronic bids from said advertisers for specific advertisements to be presented to clients with matching client profile information;

d. Selecting the highest bid among the electronic bids received within a specified time period;

e. Transmitting the selected electronic advertisement to the matching clients;

f. Calculating the delivery fee for the selected advertisement; and g. Generating and transmitting an advertising bill to the corresponding advertiser.

17. A computerized method for supplying and pricing electronic advertisements, comprising:

a. Storing client profile information in a computer database;

b. Providing the client profile information to advertisers;

c. Receiving electronic bids from said advertisers for specific advertisements to be presented to clients with matching client profile information;

d. Selecting the highest bid among the electronic bids received within a specified time period; and e. Transmitting the selected electronic advertisement to the matching client.

* * * * *